United States Patent Office 3,356,732
Patented Dec. 5, 1967

3,356,732
2-[p-(PHENYLSULFONYL)PHENYL]-1,3-INDANE-DIONE AND ITS TAUTOMER
Hans-Dieter Becker, Schenectady, N.Y., assignor to General Electric Company, a corporation of New York
No Drawing. Filed Mar. 29, 1966, Ser. No. 538,240
3 Claims. (Cl. 260—590)

This invention relates to the chemical compound 2-[p-(phenylsulfonyl)phenyl] - 1,3 - indanedione which in the solid state exists in its enol form which can be named 3-hydroxy-2-[p-(phenylsulfonyl)phenyl]-1-indenone.

In the search for chemical compounds having anticoagulant activity in blood, many 1,3-indanedione compounds have been investigated. In evaluating the usefulness of these compounds as anticoagulants, their effectiveness is usually compared with that of bishydroxycoumarin, generally known as dicumarol, the first clinically developed coumarin derivative found useful as an anticoagulant. The therapeutic activity of these compounds depends upon the ability to prolong the prothrombin time by suppression of the formation of prothrombin by the liver.

Many of the 1,3-indanedione compounds, which have been used for anticoagulants, have relatively short duration of activity and therefore, require that they be administered frequently. Therefore, it is desirable to have a chemical compound which will have high activity as an anticoagulant, and also will retain this activity for a relatively long time. Such a compound would require relatively small doses to be given, no more than once a day, to maintain a given level of anticoagulant activity in the blood.

I recently synthesized the new chemical compound 2-[p-(phenylsulfonyl)phenyl]-1,3-indanedione. In the solid state, this compound exists in its tautomeric enol form as ruby red crystals, but changes almost completely to the keto form at its melting point forming a light yellow melt. This melt readily supercools to a light yellow solid thereby freezing the compound in its keto form. In order to rapidly reconvert the solid keto form of the compound to the enol form, the keto form should be held at a temperature slightly below the melting point until the enol form crystallizes.

Alternatively, the solid keto form can be dissolved in a polar solvent which converts the keto form to the enol form.

When dissolved in polar solvents, and especially hydroxylic solvents, e.g., alcohols, the compound ionizes forming the enolate ion. As such it will form salts with aqueous metal hydroxides or metal alcoholates to form the corresponding metal salts, e.g., the alkali and alkaline earth metal salts, etc.

When acid is added to an alcohol solution of the compound, an equilibrium between the enol and keto forms is established until sufficient acid is added that the hydrogen ion from the acid drives the equilibrium to the point where all of the compound is in the keto form as shown by the equation.

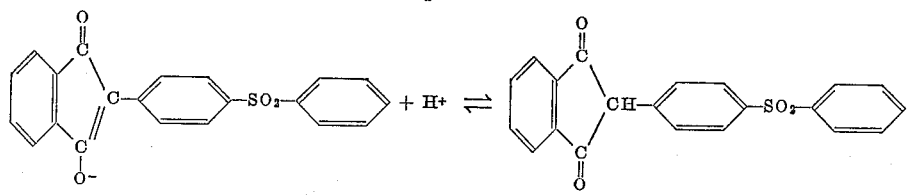

When dissolved in non-polar solvents, e.g., ethers, chloroform, benzene, etc., the compound exists in the keto form. In the solid state, the enol form is intense red in color and in solution forms deep yellow to orange solutions. In either the solid state or in solution, the keto form is essentially colorless, with any color being due to the presence of a slight amount of the enol form. Therefore, the particular form that the compound is in is readily determined by its color. If both the enol and keto forms are present in solution, as for example in an acidified alcohol solution, the color is dependent upon the concentration of the enol form present. Addition of more acid will cause the solution to become less colored. In the ultraviolet region of the spectra, the enol form shows strong absorption in the region of 370 m$\mu$ which decreases as the equilibrium is shifted to the keto form, thus providing a convenient method of determining the amount of each form present in solution.

The tautomerism that exists between these compounds is shown below with the characteristics of each.

|  | Enol Form | Keto Form |
|---|---|---|
| Formula | 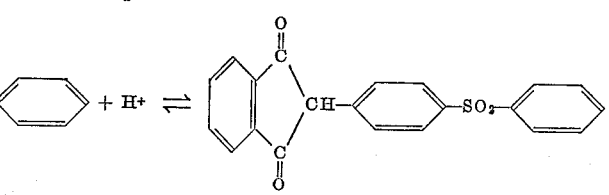 |  |
| Name | 3-hydroxy-2-[p-(phenylsulfonyl)phenyl]-1-indenone | 2-[p-(phenylsulfonyl)-phenyl]-1,3-indanedione |
| Color | ruby red | colorless |
| Existence | In crystalline state and as enolate ion, in polar solvents in absence of acids. Presence of acids cause shift towards keto form. | In molten state, in supercooled state, in solution in non-polar solvents and in acidified polar solvents. |

The enol form of this compound, when administered to rhesus monkeys, was shown to have high activity as an anticoagulant, as shown by the increase in prothrombin time. This activity was retained over a relatively long period of time.

In order that those skilled in the art may better understand my invention, the following examples are given by way of illustration and not by way of limitation. In the

Example 1

This example illustrates the synthesis of 2-[p-(phenylsulfonyl)phenyl]-1,3-indanedione. A solution of 11.6 g. of phenyl-p-tolylsulfone in 200 ml. of anhydrous dimethylformamide was prepared. While stirring the mixture by means of a stream of nitrogen, 12.0 g. of potassium-t-butoxide was added rapidly producing a deep, red solution. To this solution, 10 ml. of diethylphthalate was added dropwise to regulate the exothermic reaction which occurs. The dark green colored reaction mixture was agitated with nitrogen for 1 hour, after which 500 ml. of ice water was added, whereupon the reaction mixture became orange-red in color. After extracting with 100 ml. of ether to remove unreacted starting material, the aqueous layer was acidified with a mixture of 40 ml. of concentrated hydrochloric acid and 60 ml. of water, and shaken with 100 ml. of ether which was not removed. A deep red, solid remained dispersed in the aqueous layer and was removed by filtration. This precipitate, weighing 16.4 g., was recrystallized by dissolving in boiling chloroform and adding absolute methanol, to produce 8.6 g. of recrystallized ruby red crystals, identified as the enol form of 2-[p-(phenylsulfonyl)phenyl]-1,3-indanedione, having a melting point of 197–198° C. At and above its melting point, the compound became a light yellow melt which again became ruby red on crystallizing, when held slightly below its melting point. Quick cooling gave a slight yellow solid of the keto form. Elemental analysis showed that it contained 69.44% carbon, 3.83% hydrogen and 8.71% sulfur, compared to theoretical values of 69.61% carbon, 3.89% hydrogen and 8.85% sulfur for $C_{21}H_{14}O_4S$.

These red crystals of the enol form are slightly soluble in ether and benzene and readily soluble in chloroform forming colorless solutions of the keto form. The red crystals dissolve in aqueous sodium hydroxide to form a deep yellow solution of the sodium salt. Solutions of the enol form in polar solvents, for example, dimethylsulfoxide, methanol, etc., are intense yellow. The methanol solution will become progressively lighter in color as aqueous hydrochloric acid is added incrementally, and finally becomes colorless. By use of these techniques, it is very easy to convert one tautomer into the other.

Other alkyl esters of phthalic acid can be used in place of diethylphthalate, and other alkoxides other than potassium-t-butoxide can be used in producing this compound, for example, the alkali metal alkoxides of the lower alkyl alcohols. This compound may also be made by reaction of p-(phenylsulfonyl)phenyl acetic acid with phthalic anhydride or the esters of these two reactants or by a condensation of p-(phenylsulfonyl)benzaldehyde with phthalide.

Example 2

Clinical tests on white mice (Taconic Swiss) showed that the 2-[p-(phenylsulfonyl)phenyl]-1,3-indanedione was not lethal when tested in doses up to as high as 100 mg./kg. The solid enol in sufficient aqueous 0.5% methylcellulose to form a suspension was intravenously injected.

Example 3

A rather large dose of 25 mg./kg. of the solid enol form of 2-[p-(phenylsulfonyl)phenyl]-1,3-indanedione, in sufficient 0.5% aqueous methylcellulose to form a suspension, was administered orally to a rhesus monkey. Table I shows the prothrombin time measured in seconds, determined on samples of the blood, taken before administration (control) of the 2-[p-(phenylsulfonyl)phenyl]-1,3-indanedione and at the specified time, as shown in the table, after administration of this material.

TABLE I

| | Prothrombin time, seconds |
|---|---|
| Control | 15.4 |
| 1 hour | 15.9 |
| 6 hours | 15.9 |
| 1 day | 22.6 |
| 2 days | 26.0 |
| 3 days | 47.2 |
| 5 days | 42.6 |
| 7 days | 42.9 |

This example illustrated that 2-[p-(phenylsulfonyl)phenyl]-1,3-indanedione had considerable anticoagulant activity as demonstrated by the increase prothrombin time and that this activity, once initiated, was sustained, over a long period of time.

Example 4

This example compares the anticoagulant activity of 2-[p-(phenylsulfonyl)phenyl]-1,3-indanedione with bishydroxycoumarin, a material widely used because of its anticoagulant activity. In this example, the compounds were administered orally to rhesus monkeys and the prothrombin time at various times determined, as in Example 3. The results are shown in Table II.

TABLE II

| | PROTHROMBIN TIME | | | | | |
|---|---|---|---|---|---|---|
| | Bishydroxycoumarin, total dose 25 mg. (9.51 mg./kg.) | | | 2-[p-(phenylsulfonyl)phenyl]-1,3-indanedione, total dose 25 mg. (8.59 mg./kg.) | | |
| | Seconds | Increase Over Control | Percent Increase Over Control | Seconds | Increase Over Control | Percent Increase Over Control |
| Control | 13.5 | | | 13.0 | | |
| 6 hrs | 15.2 | 1.7 | 12.6 | 15.2 | 2.2 | 16.9 |
| 24 hrs | 22.3 | 8.8 | 65.2 | 21.6 | 8.6 | 66.1 |
| 48 hrs | 26.8 | 13.3 | 98.7 | 29.5 | 16.5 | 127.0 |
| 96 hrs | 13.0 | −0.5 | | 37.5 | 14.5 | 111.6 |
| 7 days | 15.3 | 1.8 | 13.3 | 33.1 | 20.1 | 154.1 |
| 15 days | 14.0 | 0.5 | 3.7 | 17.0 | 4.0 | 30.8 |

It will be noted that the 2-[p-(phenylsulfonyl)phenyl]-1,3-indanedione not only shows a higher increase in prothrombin time, but also a more lasting effect in anticoagulant activity over that shown by bishydroxycoumarin even though the dose on a weight basis was higher in the monkey receiving the bishydroxycoumarin.

In the above examples, the prothrombin times were determined by the Quick Method using a Metro Clot Timer.

In addition to the use of 2-[p-(phenylsulfonyl)phenyl]-1,3-indanedione, in its enol form, it likewise may be used in the form of its non-toxic metal salts, preferably its sodium salt. It is not clear whether it is the enol or keto form which actually functions as the anticoagulant, but anticoagulant activity of 1,3-indanediones appear to be related to their ability to tautomerize and have both a keto and enol form. Likewise, this compound can be incorporated in various pharmaceutical preparations, such as tablets, capsules, etc. and may be mixed in suitable proportions with non-toxic pharmaceutical carriers, such as starches, gums, sugars, etc.

Obviously, other modifications and variations of the present invention are possible in light of the above techings. It is therefore to be understood that changes may be made in the particular embodiments herein mentioned and described, which are within the full intended scope of the invention as described by the appended claims.

What I claim as new and desire to secure by Letters Patent of the United States is:

1. The tautomeric compounds corresponding to the empirical formula $C_{21}H_{14}O_4S$ selected from the group consisting of 3-hydroxy-2-[p-(phenylsulfonyl)phenyl]-1-indenone and 2-[p-(phenylsulfonyl)phenyl]-1,3-indanedione.

2. The tautomer of claim 1 having the name 3-hydroxy-2-[p-(phenylsulfonyl)phenyl]-1-indenone.

3. The tautomer of claim 1 having the name 2-[p-(phenylsulfonyl)phenyl]-1,3-indanedione.

References Cited

UNITED STATES PATENTS 2,899,358   8/1959   Sperber _____ 167—65

DANIEL D. HORWITZ, *Primary Examiner.*